Patented July 17, 1934

1,967,206

UNITED STATES PATENT OFFICE 1,967,206

MANUFACTURE OF ARTIFICIAL SILK

Gustav Hardt, Elizabethton, Tenn., assignor to American Bemberg Corporation, New York, N. Y., a corporation of Delaware No Drawing. Application October 4, 1932, Serial No. 636,179

3 Claims. (Cl. 106—40)

My present invention has to do with a new and novel method for producing artificial cellulosic products with a low lustre.

More especially, my present invention concerns a new method for producing artificial filaments which possess the desirable low lustre of real silk.

One object of the present invention is to provide a novel method for producing a filament or thread of artificial silk which has greater opacity and covering power, and which possesses a low or dull lustre.

Other objects will become apparent from a study of the following specification and claims.

In the manufacture of artificial filaments, a cellulosic solution is prepared (cuprammonium viscose, nitrocellulose or organic derivatives of cellulose), and spun or extruded into a medium which tends to harden the filaments thus formed. My present invention has to do with a new and novel mixture or compound, to be added to the spinning solution before the filaments are formed, and which remains in the filaments during the after treatment thereof. The presence of this substance in the filaments gives them the greater opacity and covering power desired and renders them lustreless, or dull, in appearance.

I prepare an emulsion which is added to the solution, said emulsion containing, as a mixture, casein, turpentine, and petrolatum. This mixture is added to and thoroughly mixed with the solution prior to the formation of filaments therefrom.

I have found that the best results are obtained when a mixture of the following percentages are used, all percentages being based on the cellulose content of the solution:

| | Percent |
|---|---|
| Casein | 10 |
| Turpentine | 10 |
| Petrolatum | 10 |

Having now set forth my invention as required by the patent statutes, what I desire to claim is:

1. A cellulosic solution for use in the production of filaments, threads, etc., containing an emulsion of approximately:

| | Percent |
|---|---|
| Casein | 10 |
| Turpentine | 10 |
| Petrolatum | 10 | all percentages being based on the cellulose content of the solution.

2. A viscose solution for use in the production of filaments, threads, etc., containing an emulsion of approximately:

| | Percent |
|---|---|
| Casein | 10 |
| Turpentine | 10 |
| Petrolatum | 10 | all percentages being based on the cellulose content of the solution.

3. A cuprammonium solution for use in the production of filaments, threads, etc., containing an emulsion of approximately:

| | Percent |
|---|---|
| Casein | 10 |
| Turpentine | 10 |
| Petrolatum | 10 | all percentages being based on the cellulose content of the solution.

GUSTAV HARDT.